(12) United States Patent
Li et al.

(10) Patent No.: US 8,674,238 B2
(45) Date of Patent: Mar. 18, 2014

(54) GUIDEWAY MECHANISM

(75) Inventors: Shen-Chun Li, New Taipei (TW);
Hsien-Chuan Liang, New Taipei (TW);
Shou-Kuo Hsu, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 291 days.

(21) Appl. No.: 13/182,428

(22) Filed: Jul. 13, 2011

(65) Prior Publication Data

US 2012/0269471 A1    Oct. 25, 2012

(30) Foreign Application Priority Data

Apr. 22, 2011 (TW) .............................. 100113959 A

(51) Int. Cl.
*H02B 1/40* (2006.01)
*E04C 2/52* (2006.01)

(52) U.S. Cl.
USPC .......... 174/492; 174/68.1; 174/135; 52/220.3

(58) Field of Classification Search
USPC ...................... 248/53, 220.1, 57, 58, 65, 317;
52/127.5, 220.3, 220.7, 238.1, 239,
52/337, 648.1, 655.1, 220.8; 211/188,
211/190, 194; 174/68.1, 70 R, 72 R, 68.3,
174/135
See application file for complete search history.

(56) References Cited

U.S. PATENT DOCUMENTS

| | | | | |
|---|---|---|---|---|
| 3,829,999 | A * | 8/1974 | Bernstein | 52/648.1 |
| 4,542,612 | A * | 9/1985 | Daga | 52/337 |
| 6,792,732 | B2 * | 9/2004 | Strassle et al. | 52/655.1 |
| 6,964,138 | B2 * | 11/2005 | Carroll et al. | 52/239 |
| 6,972,368 | B2 * | 12/2005 | VanderVelde | 174/492 |
| 8,468,951 | B2 * | 6/2013 | Li et al. | 105/155 |
| 2007/0125016 | A1 * | 6/2007 | Yu et al. | 52/220.7 |
| 2007/0227994 | A1 * | 10/2007 | Cho | 211/188 |

* cited by examiner

*Primary Examiner* — Tan Le
(74) *Attorney, Agent, or Firm* — Altis Law Group, Inc.

(57) ABSTRACT

An exemplary guideway mechanism includes two branches, a group of connecting blocks, and a supporting bracket. The group of connecting blocks includes four connecting blocks arranged at four corners of an imaginary square and connecting the supporting bracket. Each branch includes two parallel rails. Adjacent ends of the rails of each branch respectively connect two adjacent connecting blocks.

6 Claims, 8 Drawing Sheets

_US 8,674,238 B2_

GUIDEWAY MECHANISM

BACKGROUND

1. Technical Field

The disclosure relates to a guideway mechanism used in a workshop.

2. Description of Related Art

In a typical workshop, a mobile platform moves along a rail mounted on a ceiling of the workshop. A manipulator of a robot is suspended from the mobile platform, and the mobile platform and the robot control work on a production line below the mobile platform. However, adaptability of a conventional rail is poor. When an extending direction of the rail along the ceiling of the workshop needs to be changed, all parts of the original rail must be dismantled from the ceiling and replaced with a newly assembled rail having an extending direction different from that of the original rail.

What is needed, therefore, is a guideway mechanism which can overcome the limitations described.

DETAILED DESCRIPTION

Figure 1:
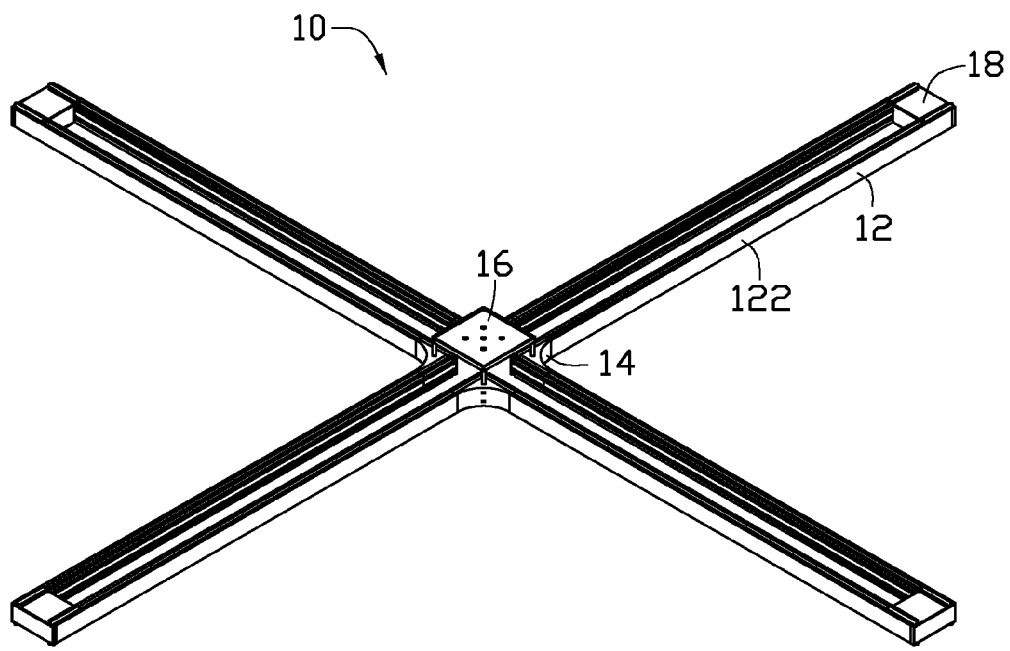
FIG. 1 is an assembled, isometric view of a guideway mechanism in accordance with a first embodiment of the disclosure.

Referring to FIG. 1, a guideway mechanism 10 in accordance with a first embodiment is shown. The guideway mechanism 10 can be mounted on a ceiling of a workshop. A mobile platform (not shown) can be mounted on the guideway mechanism 10 and can move along the guideway mechanism 10. An electrical source (not shown) is connected to the mobile platform via a plurality of electrical wires (not shown) to drive the mobile platform to move along the guideway mechanism 10. The guideway mechanism 10 is substantially cross-shaped, and includes four branches 12, a group of connecting blocks 14, a supporting bracket 16, and four locking members 18.

Figure 2:
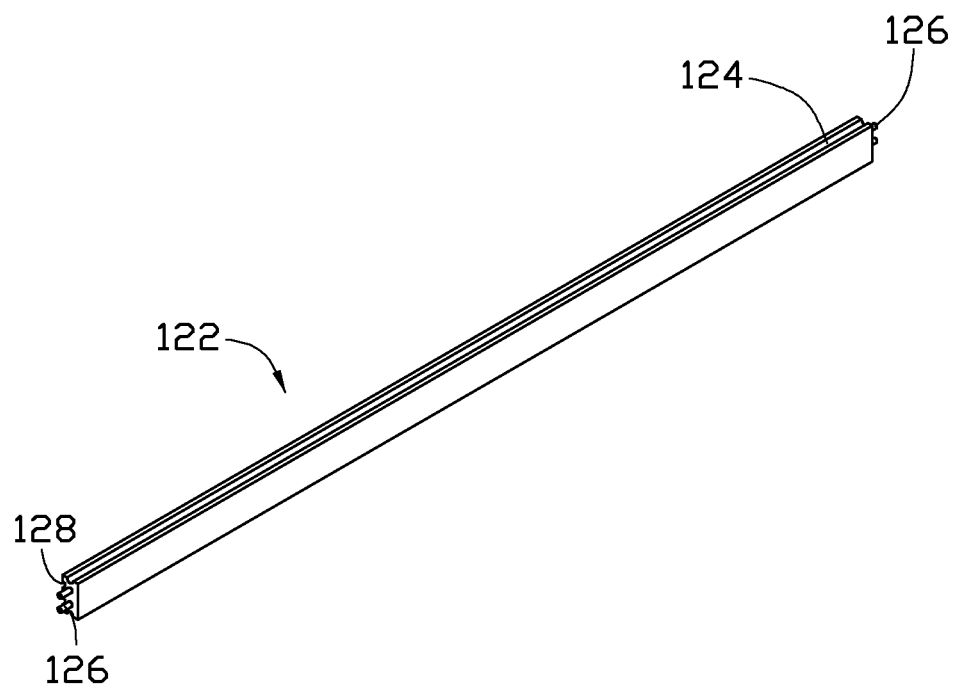
FIG. 2 is an enlarged view of a rail of the guideway mechanism of FIG. 1.

Each branch 12 includes two parallel rails 122. Two adjacent rails 122 respectively located in two adjacent branches 12 are perpendicular to each other, and connected together by a respective connecting block 14. Also referring to FIG. 2, each rail 122 defines two elongated first grooves 124 respectively in top and bottom sides thereof along a lengthwise direction. A transverse cross section of each first groove 124 defines a substantially semicircular shape. Each rail 122 defines two elongated second grooves 128 in an inner side thereof along the lengthwise direction, for receiving the electrical wires of the electrical source. A transverse cross section of each second groove 128 is rectangular. Two spaced connecting posts 126 protrude from each end of the rail 122.

Figure 3:
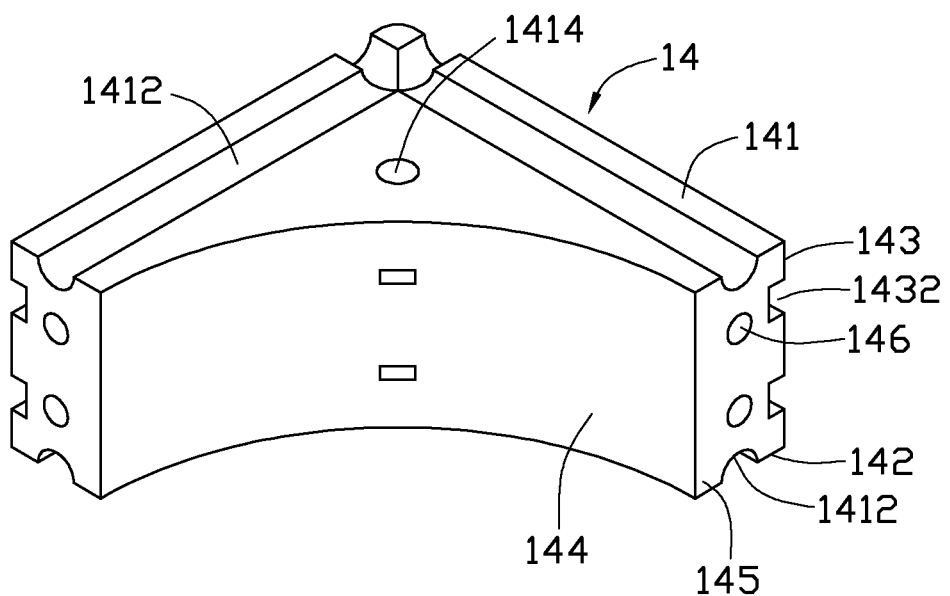
FIG. 3 is an enlarged view of a connecting block of the guideway mechanism of FIG. 1.

Also referring to FIG. 3, the group of connecting blocks 14 includes four connecting blocks 14 arranged at four corners of an imaginary square. Each connecting block 14 includes a top face 141, a bottom face 142 parallel to the top face 141, two perpendicularly adjacent inner side faces 143, an arc-shaped outer side face 144, and two connecting faces 145 located at two ends of the connecting block 14. Each connecting block 14 defines two elongated, perpendicular third grooves 1412 in each of the top and bottom faces 141, 142 thereof. A fixing hole 1414 is defined in the top face 141 of each connecting block 14. Two parallel fourth grooves 1432 are defined in each inner side face 143 of each connecting block 14, for receiving the electrical wires of the electrical source. A transverse cross section of each fourth groove 1432 is rectangular. Two spaced connecting holes 146 are defined in each connecting face 145 of each connecting block 14. The two connecting posts 126 of one end of a respective rail 122 are inserted into the two connecting holes 146 in a corresponding end of the connecting block 14, so that the third grooves 1412 and the fourth grooves 1432 of the connecting block 14 respectively communicate with the first grooves 124 and the second grooves 128 of the rail 122.

Figure 4:
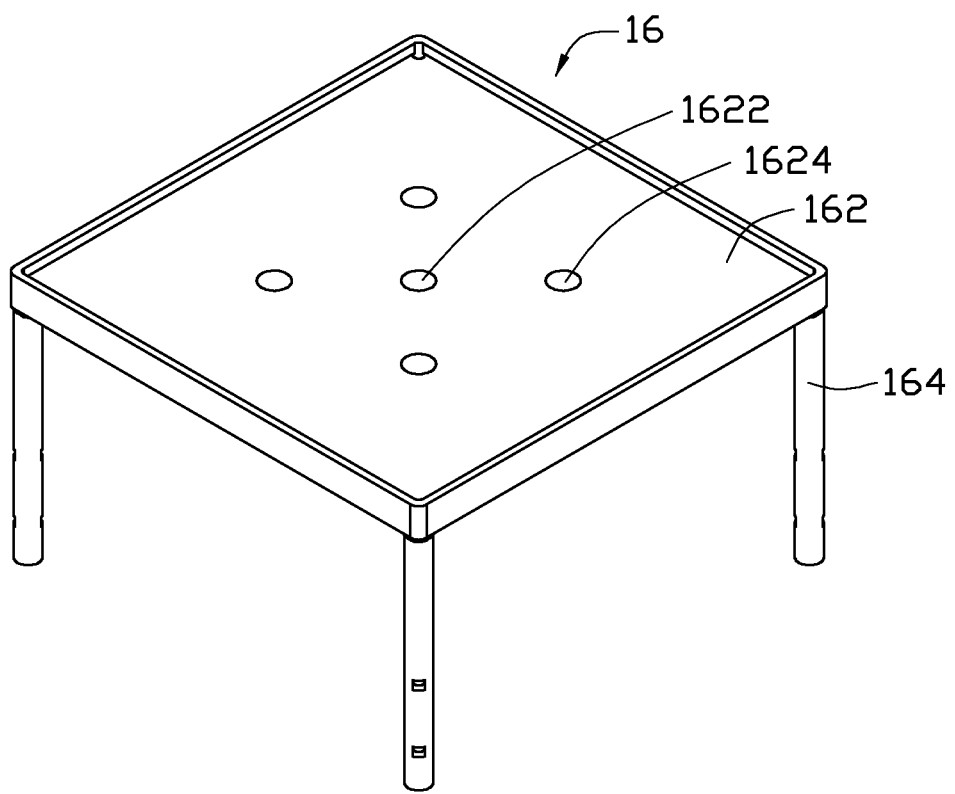
FIG. 4 is an enlarged view of a supporting bracket of the guideway mechanism of FIG. 1.

Also referring to FIG. 4, the supporting bracket 16 is connected to the group of connecting blocks 14. The supporting bracket 16 includes a rectangular top plate 162 and four supporting poles 164 extending perpendicularly downwardly from four corners of the top plate 162. The top plate 162 defines a fastening hole 1622 in a center thereof, and four through holes 1624 evenly arranged around the fastening hole 1622. A fastener (not shown) can extend through the fastening hole 1622 of the top plate 162 to fasten the guideway mechanism 10 on the ceiling of the workshop. The four through holes 1624 are used for the electrical wires of the electrical source to extend therethrough. A bottom end of each supporting pole 164 is inserted into the fixing hole 1414 of a corresponding connecting block 14, to connect the supporting bracket 16 with the group of connecting blocks 14.

Figure 5:
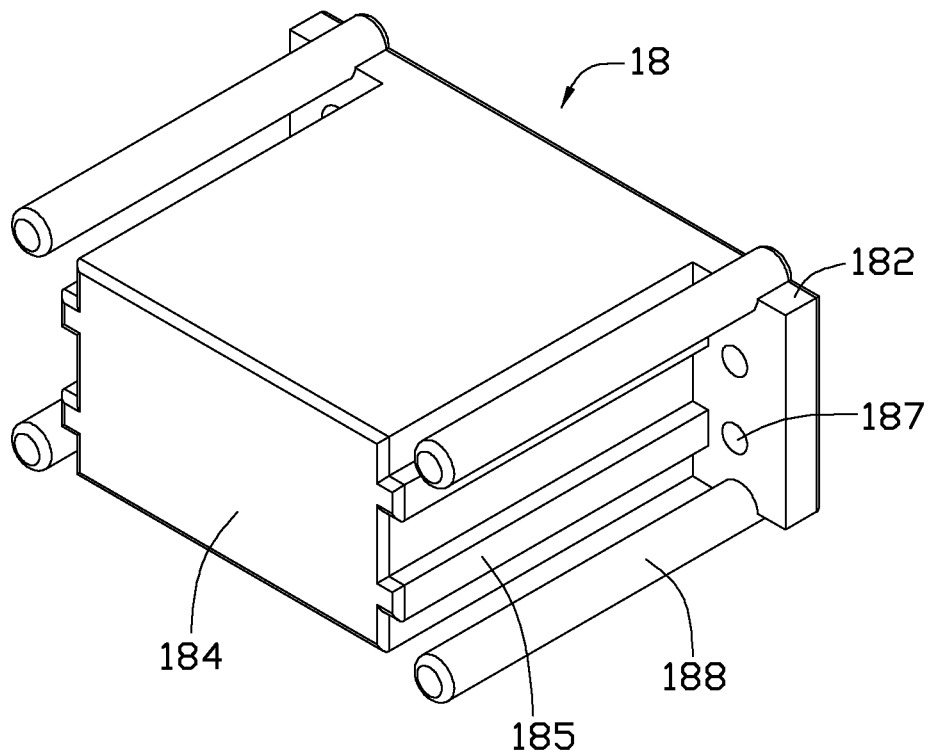
FIG. 5 is an enlarged view of a locking member of the guideway mechanism of FIG. 1.

Also referring to FIG. 5, each locking member 18 is connected to the ends of the two rails 122 of a corresponding branch 12 which are away from the connecting blocks 14. Each locking member 18 includes a rectangular side plate 182, a blocking portion 184 extending perpendicularly from a middle of the side plate 182, and two spaced column-shaped protruding poles 188 extending perpendicularly from each of two ends of the side plate 182. Each of the two ends of the side plate 182 defines two spaced circular through holes 187 therein. The two protruding poles 188 are located at two opposite sides of the group of two through holes 187. Two spaced protruding bars 185 protrude from each of two opposite sides of the blocking portion 184 generally toward the protruding poles 188. A transverse cross section of each protruding bar 185 is rectangular. The protruding bars 185 and the protruding poles 188 are parallel to each other. The protruding bars 185 and the protruding poles 188 of each locking member 18 are respectively inserted into the first grooves 124 and the second grooves 128 in the ends of the two rails 122 of the corresponding branch 12. The connecting posts 126 of the ends of the two rails 122 of the corresponding branch 12 are inserted into the through holes 187 of the locking member 18. The blocking portion 184 of each locking member 18 is sandwiched between the two rails 122 of the corresponding branch 12.

Figure 6:
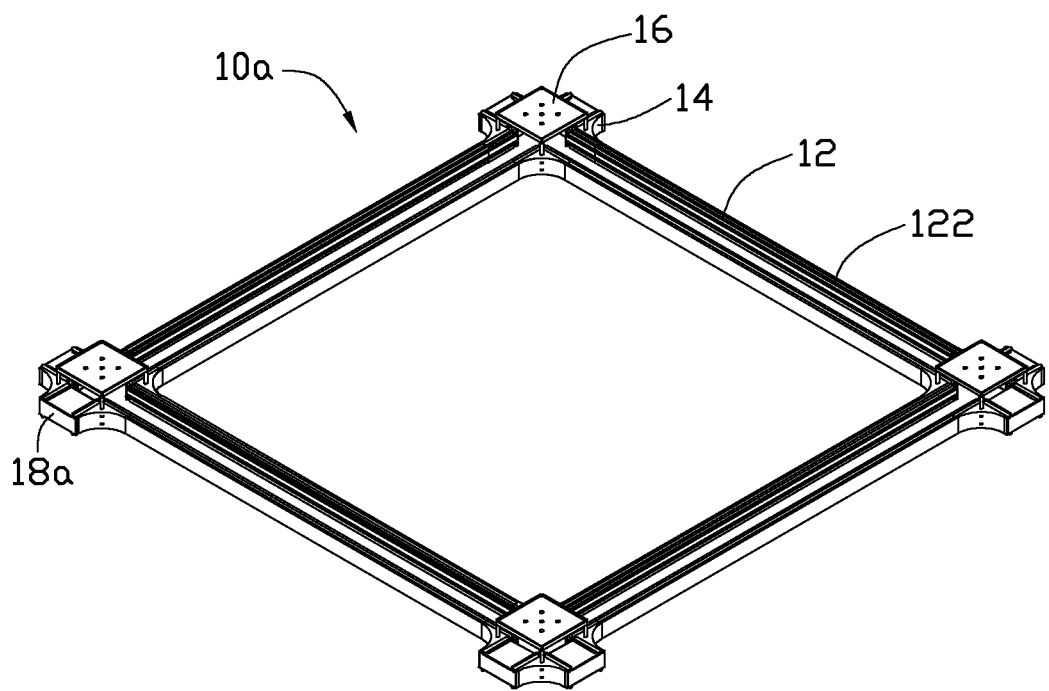
FIG. 6 is an assembled, isometric view of a guideway mechanism in accordance with a second embodiment of the disclosure.

Also referring to FIG. 6, a guideway mechanism 10a in accordance with a second embodiment is shown. The guideway mechanism 10a is frame-shaped, and includes four branches 12, four groups of connecting blocks 14, four supporting brackets 16, and eight locking members 18a. Each group of connecting blocks 14 is connected to one corresponding supporting bracket 16, and includes four connecting blocks 14 arranged at four corners of an imaginary square. Each branch 12 includes two parallel rails 122. Each of two ends of each rail 122 connects one corresponding connecting block 14. Two adjacent rails 122 respectively located in two adjacent branches 12 are perpendicular to each other, and connected together by a respective connecting block 14 of one corresponding group of connecting blocks 14. The other two rails 122 respectively located in the two adjacent branches 12 connect another two respective connecting blocks 14 of the one corresponding group of connecting blocks 14.

Figure 7:
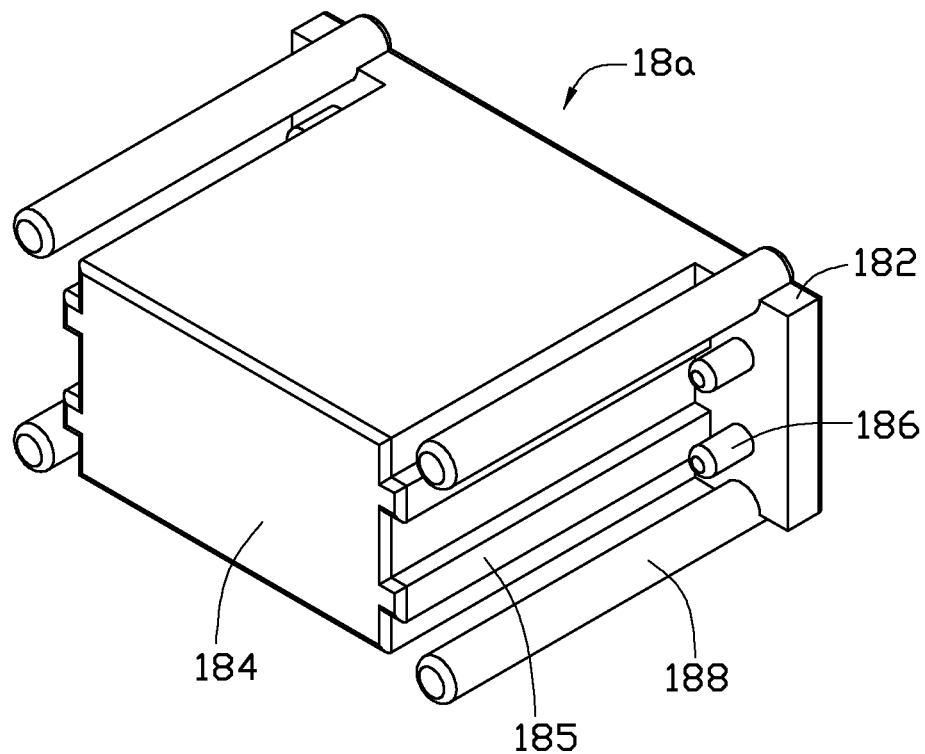
FIG. 7 is an enlarged view of a locking member of the guideway mechanism of FIG. 6.

Also referring to FIG. 7, the locking members 18a of the guideway mechanism 10a of the second embodiment are similar to the locking members 18 of the guideway mechanism 10 of the first embodiment. Each locking member 18a includes a rectangular side plate 182, a blocking portion 184 extending perpendicularly from a middle of the side plate 182, two spaced column-shaped protruding poles 188 extending perpendicularly from each of two ends of the side plate 182, and two spaced protruding bars 185 protruding from each of two opposite sides of the blocking portion 184 generally toward the protruding poles 188. The locking members 18a of the second embodiment and the locking members 18 of the first embodiment differ in that each locking member 18a has two spaced column-shaped protrusions 186 protruding from each of the two ends of the side plate 182. That is, the protrusions 186 effectively replace the through holes 187 of the locking member 18 of the first embodiment. At each end of the side plate 182, the two protruding poles 188 are located at two sides of the group of two protrusions 186. The length of each protruding pole 188 is larger than that of each protrusion 186. The protruding bars 185, the protruding poles 188 and the protrusions 186 are parallel to each other. In each group of connecting blocks 14, the ends of three of the connecting blocks 14 which do not connect the rails 122 connect instead the corresponding locking members 18a. That is, the protruding bars 185, the protruding poles 188 and the protrusions 186 of each locking member 18a are respectively inserted into the fourth grooves 1432, the third grooves 1412 and the connecting holes 146 of two corresponding adjacent connecting blocks 14. Thereby, the blocking portion 184 of each locking member 18a is sandwiched between two corresponding adjacent connecting blocks 14.

Figure 8:
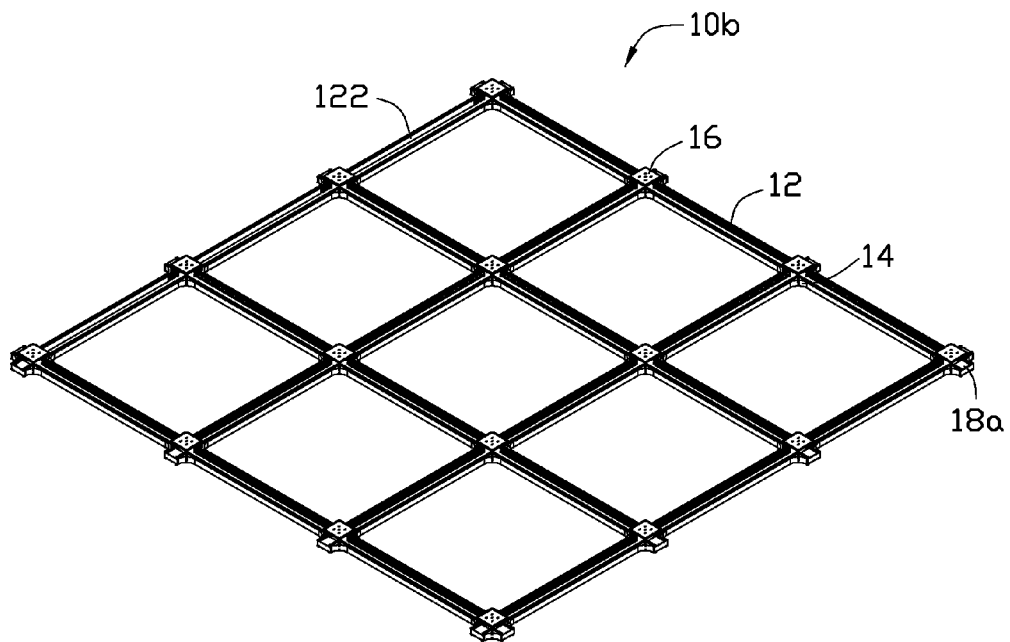
FIG. 8 is an assembled, isometric view of a guideway mechanism in accordance with a third embodiment of the disclosure.

Also referring to FIG. 8, a guideway mechanism 10b in accordance with a third embodiment is shown. The guideway mechanism 10b is in the form of a grid, and includes twenty-four branches 12, sixteen groups of connecting blocks 14, sixteen supporting brackets 16, and sixteen locking members 18a. Each group of connecting blocks 14 connects one supporting bracket 16, and includes four connecting blocks 14 arranged at four corners of an imaginary square. Each branch 12 includes two parallel rails 122. Each of two ends of each rail 122 connects one corresponding connecting block 14. Two adjacent rails 122 respectively located in two adjacent branches 12 are perpendicular to each other, and connected together by a respective connecting block 14 of one corresponding group of connecting blocks 14. The other two rails 122 respectively located in the two adjacent branches 12 connect another two respective connecting blocks 14 of the one corresponding group of connecting blocks 14. The ends of certain of the connecting blocks 14 which do not connect any of the rails 122 connect instead the corresponding locking members 18a.

According to the above, all members (i.e. rails 122, connecting blocks 14, supporting brackets 16, and locking members 18, 18a) can be conveniently dismantled from the respective guideway mechanisms and reassembled, replaced and/or added to using other suitable members to become guideway mechanisms with different shapes and configurations according to different requirements. So the adaptability of the guideway mechanisms is excellent.

It is to be understood, however, that even though numerous characteristics and advantages of the embodiments have been set forth in the foregoing description, together with details of the structures and functions of the embodiments, the disclosure is illustrative only; and changes may be made in detail, especially in matters of shape, size, and arrangement of parts within the principles of the disclosure to the full extent indicated by the broad general meaning of the terms in which the appended claims are expressed.

What is claimed is:

1. A guideway mechanism comprising:
   two branches each comprising two parallel rails;
   a group of connecting blocks comprising four connecting blocks arranged at four corners of an imaginary square, adjacent ends of the rails of each branch respectively connecting two adjacent connecting blocks;
   a supporting bracket connecting the group of connecting blocks,
   another two branches each having the same structure as the structure of each of the two branches, each of the another two branches connecting two corresponding connecting blocks, the guideway mechanism being substantially cross-shaped; and
   four locking members, adjacent ends of the two rails of each branch away from the connecting blocks connecting a corresponding locking member;
   wherein two spaced connecting posts protrude from each end of the rail, two spaced connecting holes being defined in each end of each connecting block, the two connecting posts of one end of the rail being inserted into the two connecting holes in a corresponding end of the connecting block to connect the rail with the connecting block.

2. The guideway mechanism of claim 1, wherein two adjacent rails respectively located in two adjacent branches are perpendicular to each other and connected together by a connecting block of the group of connecting blocks, and another two rails respectively located in the two adjacent branches connect another two connecting blocks of the group of connecting blocks.

3. The guideway mechanism of claim 1, wherein the supporting bracket comprises a rectangular top plate and four supporting poles extending perpendicularly downwardly from four corners of the top plate, each connecting block defining a fixing hole, a bottom end of each supporting pole being inserted into the fixing hole of a corresponding connecting block to connect the supporting bracket with the group of connecting blocks.

4. The guideway mechanism of claim 3, wherein each rail defines two elongated grooves respectively in top and bottom sides thereof along a length direction of the rail, each connecting block defining two perpendicular grooves in each of top and bottom faces thereof, the grooves of the connecting block respectively communicating with the grooves of the rail.

5. The guideway mechanism of claim 4, wherein each locking member comprises a rectangular side plate, a blocking portion extending perpendicularly from a middle of the side plate, each of two ends of the side plate defining two spaced through holes, the connecting posts of the ends of the two rails of the corresponding branch away from the connecting blocks being inserted into the through holes of each locking member to thereby connecting the corresponding branch with the locking member, the blocking portion of each locking member being sandwiched between the two rails of the corresponding branch.

6. The guideway mechanism of claim 5, wherein each locking member further comprises two spaced protruding poles extending perpendicularly from each of the two ends of the side plate, the protruding poles of each locking member being respectively inserted into the grooves in the ends of the two rails of the corresponding branch away from the connecting blocks.

\* \* \* \* \*